(12) United States Patent
Harwit

(10) Patent No.: US 6,856,474 B2
(45) Date of Patent: Feb. 15, 2005

(54) ASSEMBLED MULTI-SURFACE OPTICAL COMPONENT AND METHOD FOR FABRICATING

(75) Inventor: Alex Harwit, San Mateo, CA (US)

(73) Assignee: Intel Corporation, Santa Clara, CA (US)

(*) Notice: Subject to any disclaimer, the term of this patent is extended or adjusted under 35 U.S.C. 154(b) by 26 days.

(21) Appl. No.: 10/354,901

(22) Filed: Jan. 29, 2003

(65) Prior Publication Data

US 2004/0145820 A1 Jul. 29, 2004

(51) Int. Cl.[7] .............................. G02B 3/08; G02B 7/02
(52) U.S. Cl. ........................ 359/741; 359/742; 359/811; 359/819
(58) Field of Search .............................. 359/811, 819, 359/820, 741, 742, 743

(56) References Cited

U.S. PATENT DOCUMENTS

| | | | |
|---|---|---|---|
| 5,583,686 A | * 12/1996 | Chen | ........................ 359/198 |
| 5,692,287 A | 12/1997 | Nakamura et al. | ............ 29/558 |
| 6,166,860 A | * 12/2000 | Medvedev et al. | ......... 359/641 |
| 6,359,736 B1 | * 3/2002 | Yoshimura | ................... 359/619 |
| 6,487,334 B2 | 11/2002 | Ducellier et al. | |
| 6,501,877 B1 | 12/2002 | Weverka et al. | |
| 6,590,712 B2 | * 7/2003 | Schaller | ....................... 359/618 |
| 6,678,097 B2 | * 1/2004 | McKenney | ................. 359/742 |
| 6,694,073 B2 | 2/2004 | Golub et al. | |
| 6,704,476 B2 | 3/2004 | Ford et al. | |
| 2003/0026526 A1 | 2/2003 | Trissel et al. | |

* cited by examiner

Primary Examiner—Loha Ben
(74) Attorney, Agent, or Firm—Blankely, Sokoloff, Taylor & Zafman LLP (57) ABSTRACT

An assembled optical component has a support structure with a reference surface at which a number of individual optical elements are bonded at predetermined positions. The curvature of the reference surface is selected such that optical surfaces of the optical elements are in a predetermined orientation at their assembly positions. The optical elements are preferably planar mirrors simultaneously fabricated from a wafer. An adhesive film attached to the wafer prior to separation of the optical elements assists in temporarily positioning the elements on a temporary fixture, which holds the elements in position, while they are bonded to the support structure.

29 Claims, 5 Drawing Sheets

ASSEMBLED MULTI-SURFACE OPTICAL COMPONENT AND METHOD FOR FABRICATING

CROSS REFERENCE

This application cross-references the U.S. patent application titled "Optical Cross-Connect Switch with Telecentric Lens and Multi-Surface Optical Element" filed by inventors Dmitry V. Bakin and Cheng-Chung Huang on Jan. 29, 2003, U.S. patent application Ser. No. 10/354,887, which is hereby incorporated by reference.

FIELD OF INVENTION

The present invention relates to optical components having multiple distinct optical surfaces and a method for fabricating it. More particularly, the present invention relates to a multi-surface reflector of an optical crossbar switch and a method for fabrication thereof.

BACKGROUND OF INVENTION

With the advancement of optical telecommunication technologies optical components become increasingly complex and sophisticated in design. In an optical crossbar switch, also known as an optical cross connect (OXC), a multitude of optical communication lines may be simultaneously switched. The switching is typically performed by spatially directing focused signal beams between optical fiber interfaces. The focusing of a signal beam is commonly accomplished by placing a lens in front of the fiber end. This means that in a fiber interface with two dimensionally arrayed fiber ends lenses are arrayed in axial alignment with each fiber end.

Fiber interfaces are fabricated with ever increasing numbers of fibers while reducing the pitch between individual fiber axes. As a consequence, the fabrication of Lens arrays becomes increasingly challenging and cost intensive. To circumvent this problem, a modified OXC may be configured with a telecentric lens that simultaneously focuses a number of signal beams propagating towards and away from the fiber ends. In that context it is referred to the cross-referenced application for "Optical cross connect with simultaneous focusing of discrete signal beams".

A core component of such a modified OXC is a multi-surface optical component that is placed after the telecentric lens. The multi-surface component has a number of individually positioned optical surfaces configured and positioned such that each of the simultaneously focused signal beams impinges on a predetermined optical surface and is directed onto a moveable mirror element within a mirror array where the signal beams are spatially redirected for switching purposes.

In the preferred embodiment, the optical surfaces are planar mirrors that direct the signal beams onto individual mirrors within the moveable mirror array by means of reflection. The efficiency and dimensional scale of the modified OXC is highly dependent on the position and orientation precision with which the individual mirrors are positioned and oriented on the multi-surface component.

Optical components with multiple optical surfaces have been fabricated in several ways. In the case where a relatively low number of optical surfaces are combined and spatially arrayed with an angle between adjacent optical surfaces of more than 180 degrees, the fabrication is relatively easily accomplished. For example, U.S. Pat. No. 5,692,287 to Nakamura et al teaches a method for making a polygon mirror by machining the mirror surfaces from a monolithic metal block. As can be seen in the Figures, the fabrication of the mirror surfaces is relatively simple since the machining tool may extend beyond the individual mirror's boundaries without interfering with other mirror surfaces. Also the number and arrangement of the individual mirror surfaces does not impose unusual effort in the setup process of the work piece on the fabrication machine.

In cases where a high number of small optical surfaces needs to be fabricated with high precision into a single optical component, machining of the individual optical surfaces becomes arduous. For each optical surface, the monolithic block would need to be positioned accurately with respect to the machining tools machining plane. In cases where the optical surfaces are spatially positioned relative to each other, accurate machining positioning is difficult to accomplish. Secondly, the machining of a high number of independent optical surfaces into a single work piece bears an increasing risk of machining errors that grows with the number of optical surfaces.

In cases where the angle between adjacent optical surfaces is less than 180 degrees, machining becomes much more complicated, since the machining tool may not extend beyond the intersections of adjacent optical surfaces. Hence, machining is typically a highly unfeasible fabrication method for optical components with concavely arrayed optical surfaces.

In a modified OXC, the multi-surface component has to provide a number of discrete optical surfaces that is at least as high as the number of switched lines. As the switching capacity of an OXC advances to simultaneous switching of several thousand signal beams, there arises a need for new ways of efficiently fabricating a multi-surface component.

In one approach, individual optical elements are prefabricated with a single discrete optical surface. The optical elements are then assembled together in a one by one fashion. This is accomplished by spatially positioning each optical element in a fixture while bonding them to one another or to a support structure. The fixture provides the accurate positioning of the optical element while the bonding takes place. The spatial fixing of the optical elements requires the separate adjustment of six degrees of freedom (Translations in X,Y,Z and Tip, Tilt, and Clocking) for each individual mirror element. Even though this method may have some use in cases where a low number of optical elements are combined in a single optical component, the method is highly unpractical for fabricating optical components having a large number of discrete optical surfaces.

Therefore, there exists a need for an efficient and precise fabrication method for optical components having a large number of optical surfaces. The invention described in the following addresses this need.

SUMMARY

In an optical cross bar switch also called an optical cross connect (OXC), a multi-surface optical component has a number of optical surfaces that are spatially arrayed and positioned in a predetermined fashion. For the purpose of ease of understanding it is referred to the schematic FIG. 1. There, a simplified multi-surface component 1 has optical surfaces 10 that may be defined by the spatial position of their center points 11 and the spatial orientation of their center axes 12.

Figure 1:
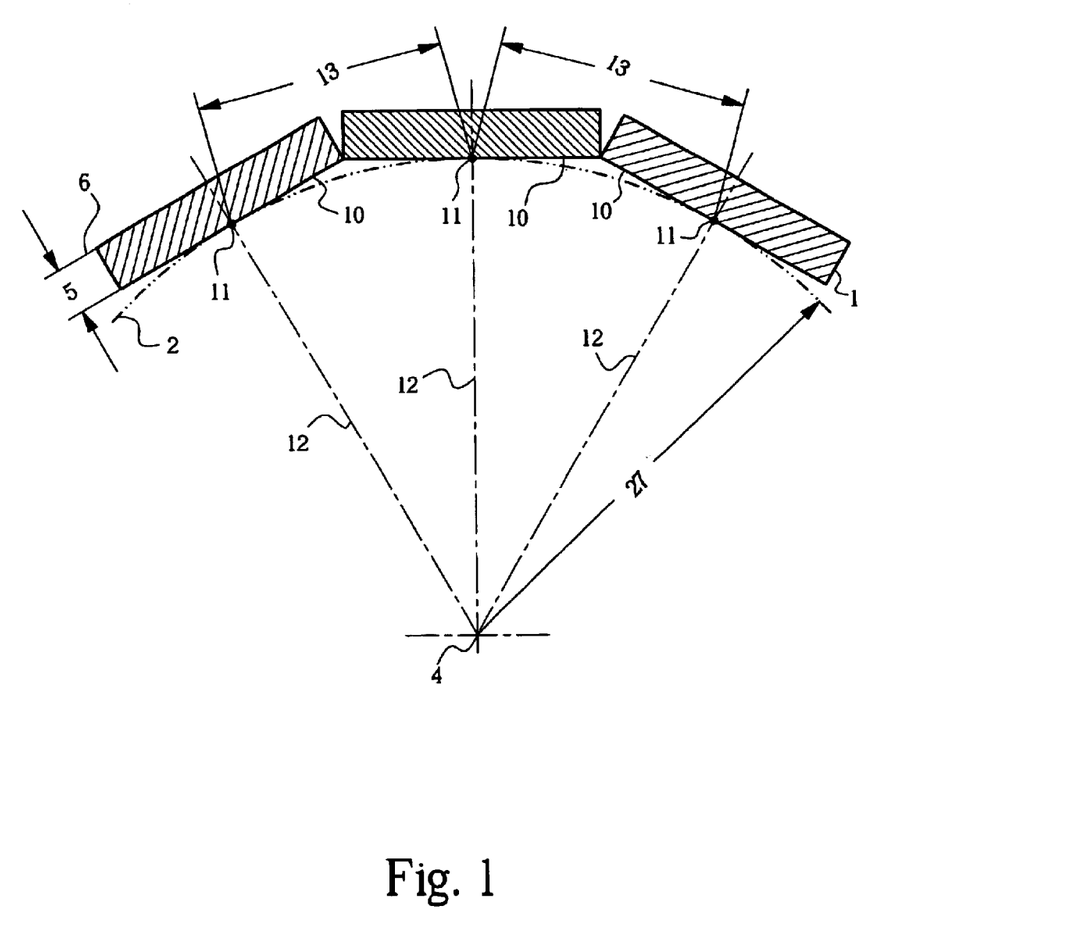
FIG. 1 shows a simplified section view of an optical component and its geometrically defining elements.

In the preferred embodiment of the invention, a fabrication method is disclosed for a multi-surface optical component 1 with center points 11 and center axes 12 being geometrically correlated to a continuous geometrical surface 2. In the example of FIG. 1, where all center axes 12 intersect in a common point 4 and the center points 11 have equal distances to the point 4, positions and orientations of each mirror 10 may be modeled in a fashion similar to that of a well-known spherical reference surface 2.

As may be well appreciated by anyone skilled in the art, the reference surface 2 may be elliptical, hyperbolical, parabolic, aspheric or may have any other continuous geometrical surface. Moreover, the reference surface 2 may in fact be an offset surface 6 from the center points 11. Each mirror's 10 position and orientation may still be modeled by simply including the offset distance 5. The present invention takes advantage of this fact and provides a support structure with a reference surface such that optical elements each having an optical surface are referenced and fixed in a predetermined spatial position and orientation. A novel method is introduced to simultaneously position all optical elements prior to bonding them on the reference surface. As a result, a multi-surface optical component may be fabricated in an efficient fashion substantially independent of the number of optical surfaces of the optical component.

Each of the independent optical elements has on one side an optical surface and on the opposite side a reference feature with which the optical element is brought into contact with a predetermined area of the reference surface whereby position and orientation of the optical element and consequently its optical surface is defined. In other embodiments, the position and orientation of the optical elements are determined by the reference surface contacting the optical surface of the independent optical elements. The optical elements are rigidly held in place while being bonded to the reference surface.

In the preferred embodiment, the optical elements of an assembled multi-surface optical component are simultaneously fabricated from a wafer. In an initial fabrication step, an initial optical surface is fabricated on top of the wafer. In the preferred case where the optical elements' optical surfaces operate as mirrors, the wafer top is simply coated with well-known layer(s) that provide the desired reflectivity. Then, an adhesive film is attached to the wafer top and the reference features of the individual elements are shaped on the bottom side of the wafer. When the optical elements are separated via the wafer's bottom surface, the adhesive film holds on to the separated optical elements. This is accomplished by maintaining the structural integrity of the adhesive film during the separation of the optical elements.

The definition of the reference features and the separation of the optical elements may be preferably accomplished by simply cutting the wafer in a predetermined pattern. The corners formed between angulated cutting gaps and the remainder of the wafer's back surface define the reference features. This simple way of separating the optical elements while creating the reference features is applicable in the case of a concave reference surface. The concave curvature of the reference surface provides clearance to the back optical elements' back surfaces while in contact with the elements' corners.

In the case of a convex curvature of the final reference surface, the reference features may be fabricated into the wafer's bottom surface independently to the step of separating the individual optical elements. Cavities may be formed by well-known etching operations at locations of the wafer bottom surface that correspond to the central bottom areas of the separated optical elements. The reference features may be defined thereby as edges or corners between cavity walls and the remainder of the wafer's bottom surface.

Once the optical elements have been separated and while the elements adhere to the adhesive film, the film is stretched over a temporary reference surface of a temporary fixture such that the reference features point away from the fixture. The curvature of the temporary reference surface is in an approximate offset to the final reference surface such that all reference features snuggly contact the final reference surface of the support structure once the reference features are forced against the support structure via the temporary fixture.

In the simplest case, the cutting operation provides not only for defining the shape of each optical element and reference features, but also contributes with its cutting gap in correspondence with the films stretch characteristic and an eventual stretching procedure to the final assembled position of the optical elements. The eventual stretching procedure may include a variation of a stretching force during stretching over the temporary fixture and/or by selectively establishing an adhesive connection between the film and the temporary reference surface. The film also may be stretched over the temporary fixture by a fluidal pressurization of it. Fluidal pressurization may be particularly used where the temporary reference surface has a concave curvature in combination with a convex curvature of the final reference surface.

Once the reference features are brought into contact with the final reference surface, the optical elements are bonded to the support structure by use of a fixing medium. The fixing medium may be a curable gel, epoxy, casting compound, or other adhesive or a solder, weld, or other metallic joint. The adhesive may be cured by UV radiation through a translucent support structure. To avoid eventual outgasing of the fixing medium and/or other affiliated components and to hermetically seal the gaps between the optical elements, the optical elements may be soldered or brazed to the support structure instead. In that case, the support structure may be a glass material that resists the soldering or welding temperatures. The reference surface is coated with a first metal layer that adheres to glass and a second metal layer that adheres to the solder and to the first metal layer. To minimize thermal deformation during the soldering process, the support structure may be made of fused silica.

The scope of the invention includes embodiments, in which the optical surfaces are non planar. In addition, by selecting the optical elements, the support structure and the fixing medium from materials having substantially the same optical properties a translucent multi-surface lens may be fabricated as well.

Further, the scope of the invention includes embodiments, in which the optical component is a multi-surface lens. In that case, the fixing medium, optical elements and support structure are translucent and have substantially the same optical properties, such that the beams impinging on the optical surfaces may propagate through the optical component substantially unaffected by interfaces between the fixing medium, the optical elements and the support structure.

DETAILED DESCRIPTION

Figure 7:
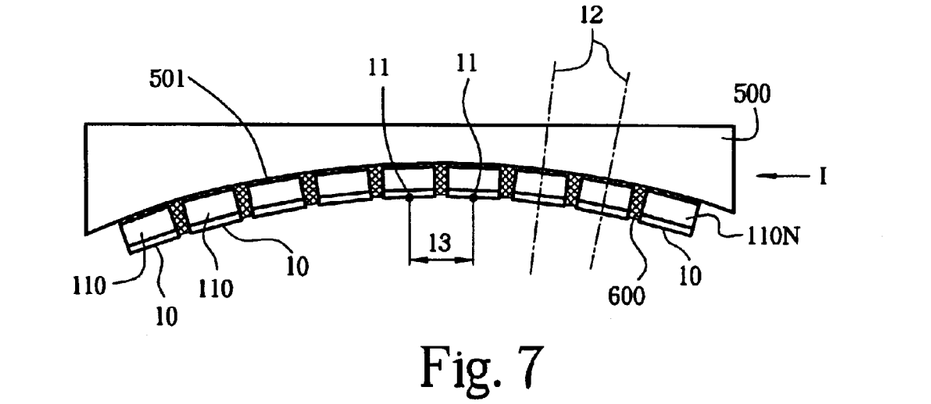
FIG. 7 illustrates a final assembled optical component in accordance with the fabrication steps depicted in FIGS. 2–6.
Figure 10:
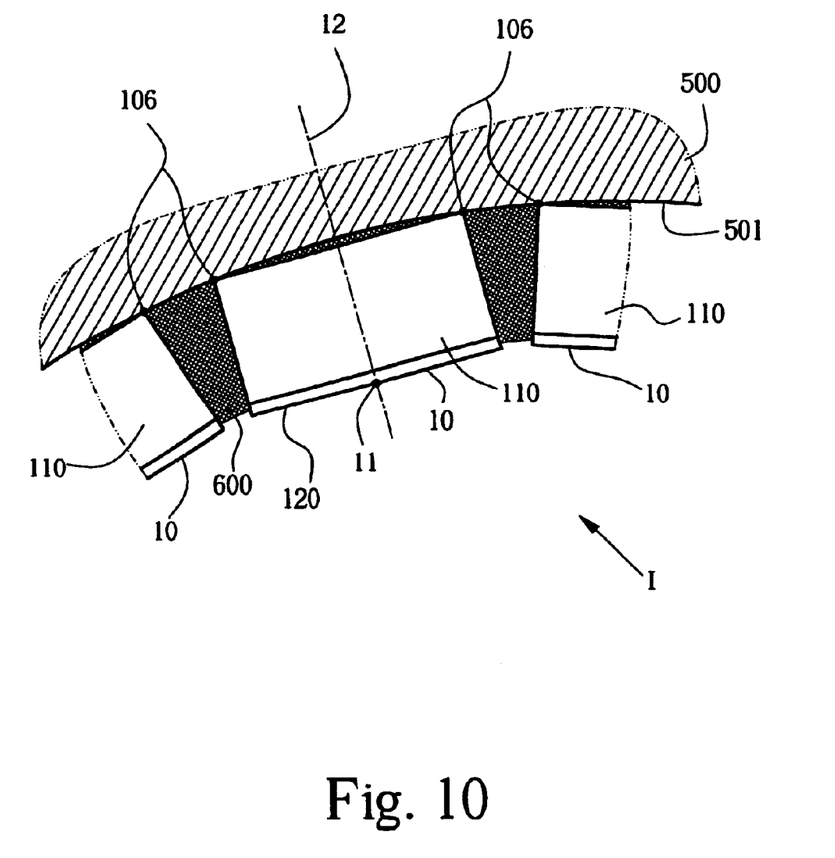
FIG. 10 shows a detail view of the optical element of FIG. 9 bonded to the support structure in the position depicted in FIG. 9.

Referring to FIG. 7, an assembled multi-surface optical component 1 includes a support structure 500 having a reference surface 501 and a number of separate optical elements 110 that are bonded to the support structure 500. Each optical element 110 has an optical surface 10 that is spatially arrayed and positioned in a predetermined fashion. As can be seen in the detailed view of FIG. 10, the distinct orientation of the optical element 110 is provided by contact of its reference features 106 with the reference surface 501.

Now referring back to FIG. 1 the geometric relationship between spatial position and orientation of the optical surfaces 10 on one hand and the reference surface 2, 6 on the other hand is described in detail. Optical surfaces 10 may be defined by the spatial position of their center points 11, the spatial orientation of their center axes 12 and their pitches 13, (see also FIGS. 5, 7). Pitches 13, are shown in a simplified fashion. It is clear to anyone skilled in the art that pitches may vary for accomplishing various assembly patterns of optical surfaces within an assembled multi-surface component 1. Further it is noted that the scope of the preferred embodiment includes cases where the surfaces 10 do not contact directly but may be separated by a gap or a shoulder or any other structural configuration appreciated by anybody skilled in the art for rigidly holding the individual elements 110 (see FIGS. 4–10).

According to the preferred embodiment of the invention and the teachings presented in the following together with FIGS. 2–7, a fabrication method is disclosed for a multi-surface optical component 1 with center points 11 and center axes 12 being preferably geometrically correlated to a continuous geometrical surface 2 and 6, in which surface 6 is an offset surface of surface 2. In the example of FIG. 1, where all center axes 12 intersect in a common point 4 and the center points 11 have equal distances to the point 4, positions and orientations of each surface 10 may be modeled in a fashion similar to that of a well-known spherical geometry of reference surfaces 2 and 6.

The reference surfaces 2 and 6 may also be elliptical, hyperbolic, parabolic, aspheric or any other well-known continuous geometrical surface. It is clear that the teachings presented in the above with respect to point 4 and radius 7 are applicable only for spherical reference surfaces 2 and 6. Nevertheless, position and orientation of each surface 10 may be modeled as a function of the reference surface's 2 defining parameters and the pitch 13. (Please note: labels 13A and 13B do not appear in any figures.) These findings are utilized by providing the final reference surface 501 corresponding to surface 6 and a temporary reference surface 401 (see FIGS. 5, 6, 8 and 9) corresponding to surface 2. The temporary reference surface 401 has a distinct function during an inventive fabrication method of the optical component 1, which will be described in the following.

Figure 2:
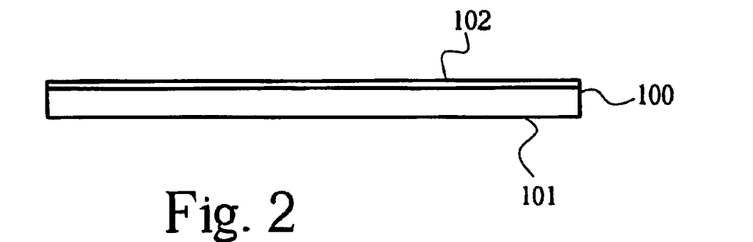
FIG. 2 depicts a fabrication step of making an optical layer on a wafer.

Referring to FIG. 2 and a preferred embodiment, the optical elements 110 are made of a wafer 100. In the case where the optical surfaces 10 are planar mirrors, a reflective coating 102 such as gold may be deposited on the wafer top surface. The invention includes embodiments, where reflectivity is established on the top surface by other well-known ways such as polishing and/or deposition of other feasible materials. Hence, the fabrication of the optical surfaces 10 is accomplished in a simultaneous fashion and highly independent of the number of separate optical surfaces 10 of the final optical component 1.

Figure 3:
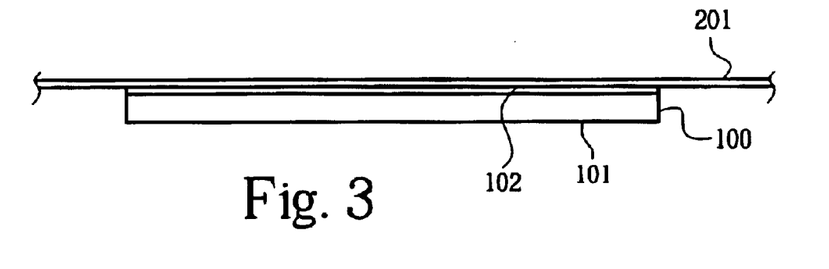
FIG. 3 depicts a fabrication step attaching an adhesive film to the wafer of FIG. 1.

The wafer 100 has also a bottom surface 101, which may be accessed during further fabrication steps after the step of attaching an adhesive film 201 to the wafer's initial optical surface 102 fabricated on its top. This is illustrated in FIG. 3.

Figure 4:
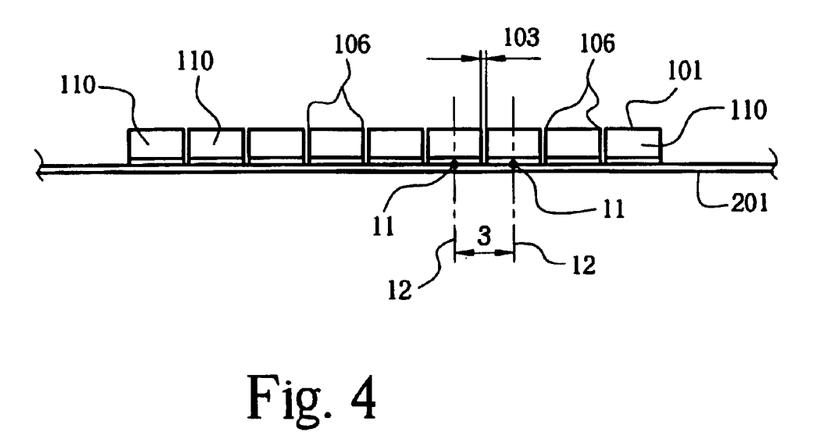
FIG. 4 depicts a fabrication step of cutting the wafer of FIG. 1 into optical elements.
Figure 5:
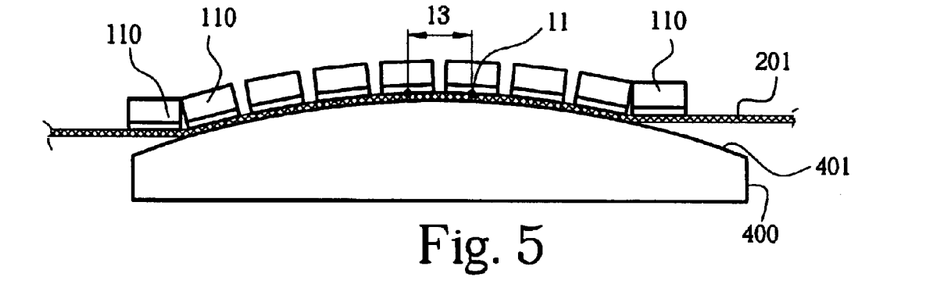
FIG. 5 depicts a fabrication step of stretching the adhesive film with the optical elements of FIG. 4 over a temporary fixture.
Figure 6:
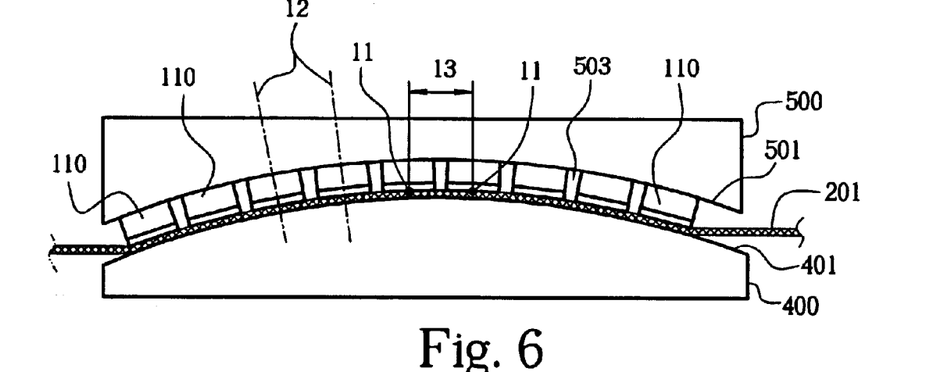
FIG. 6 depicts a fabrication step of positioning the temporary fixture of FIG. 5 and contacting the optical elements with a support structure.

As shown in FIG. 4, the wafer bottom 101 is utilized for reference features 106, by forming corners and/or edges between cavities 103 and the remaining bottom surface 101. Due to the highly precise thickness common for wafers, the reference features 106 are fabricated with a high degree of parallelism.

In the simplest case, the reference features 106 are defined between the bottom surface 101 and cutting gaps resulting from separating the wafer 100 into individual optical elements 110. The separation is accomplished while maintaining the structural integrity of the film 201. Separation may be by sawing or Deep Reactive Ion Etching (DRIE) or other material removal process. The simplest case is applied where the final reference surface 501 is concave.

During the separation not only the size of the optical elements 110 but also their initial pitch 3 is defined. Consequently, any shape and array configuration of the optical elements 110 may be defined in a simple fashion and also highly independent of the number of optical elements 110 involved.

After the optical elements 110 have been separated, the adhesive film 201 holds them together while maintaining the initial pitch 3. In a next step, depicted in FIG. 5, the adhesive film 201 is stretched over the temporary reference surface 401 of a temporary fixture 400. While the curvature of the film 201 is brought from planar to a curvature corresponding to that of the reference surface 401, the initial pitch 3 is converted into the final pitch 13 with which the optical elements 110 will be bonded onto the support structure 500 after the optical elements 110 are forced with their reference features 106 into contact with the final reference surface 501 (see FIG. 6).

Figure 8:
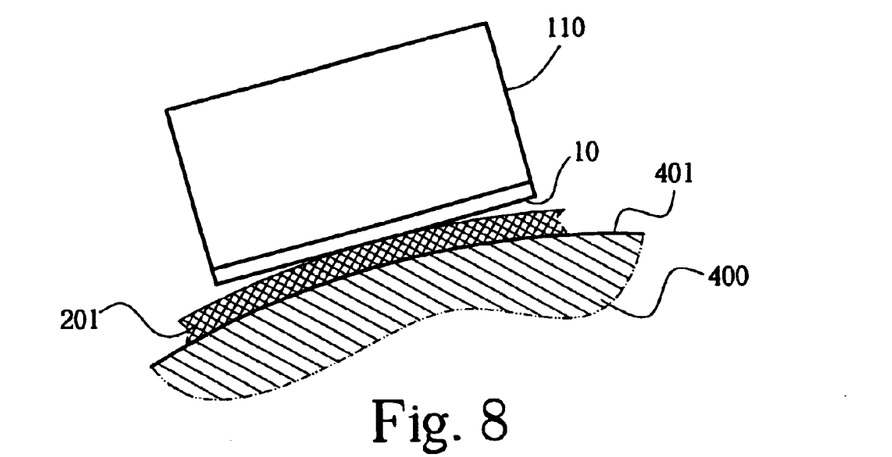
FIG. 8 shows a detail view of a single optical element fixed on the temporary fixture via the adhesive film.
Figure 9:
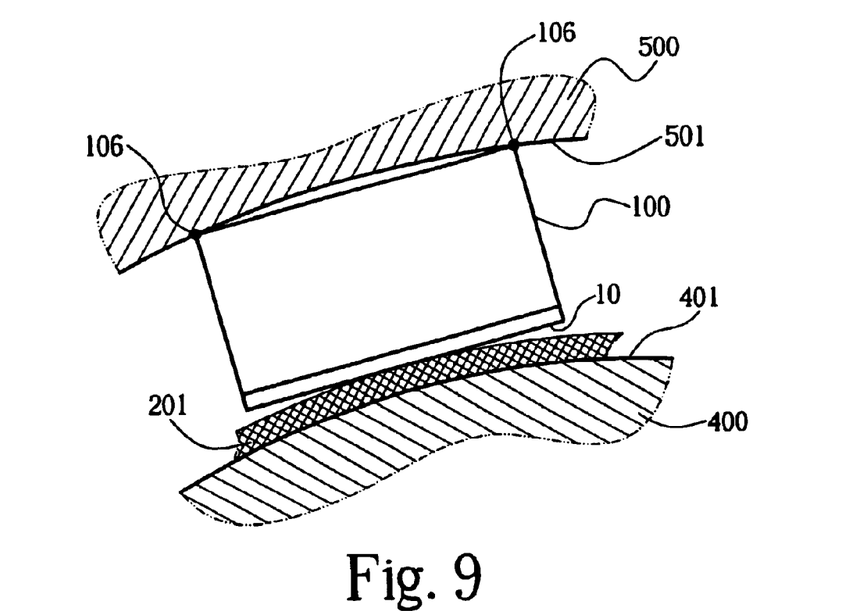
FIG. 9 shows a detail view of the optical element of FIG. 8 with its reference features contacting the support structure.

Precise spatial positioning of the optical elements 110 is accomplished during the step of stretching the film 201 over the temporary reference surface 401, while the precise spatial orientation of the optical elements 110 remains undefined. As can be seen in FIG. 8, this is mainly related to the fact that the adhesive film 201 has to compensate for the dimensional discrepancy in the offset between the curved surface 401 and the planar surfaces 10. The thickness of the adhesive film 201 is likely to be insufficient to compensate for the discrepancy in the offset such that the optical surface 10 may eventually partially lift off from the curved film 201. Only after the reference features 106 are brought into contact with the final reference surface 501, does the precise spatial orientation become defined for each optical element 110 despite an ambiguous contacting condition remaining between the film 201 and the optical surface 10 (see FIG. 9).

The optical elements 110 are bonded to the support structure while they are rigidly held via the fixture 400. In one embodiment, an adhesive may be applied in the gap between the support structure 500 and the optical elements 110. One way of doing this is by applying the adhesive onto either or both of the final reference surface 501 or the backsides of the optical elements 110 prior to forcing the optical elements 110 against the final reference surface 501. Eventual excessive adhesive is laterally squished out of the interfacing volume between optical elements 110 and the final reference surface 501. The separation gaps 103 between the optical elements 110 assist thereby in directing the adhesive flow towards the assembly's circumference. Once the adhesive is applied properly it may be cured. In case of a translucent support structure 500 and/or translucent optical elements 110 the adhesive may be a UV curing gel cured by applying a curing UV light via the support structure 500 and/or the optical elements 110.

To prevent eventual outgasing of the fixing medium 600, the optical elements 110 may alternatively be soldered and/or brazed to the support structure. In such a case, layer(s) may be deposited on the support structure and/or the optical elements to assist in establishing a reliable mechanical connection between the optical elements and the support structure 500.

Since the reference surfaces 401 and 501 are continuous geometric surfaces similar to those used for optical lenses and mirrors, the support structure 500 and/or the temporary fixture 400 may be provided by conventional lenses and/or mirrors. This additionally dramatically reduces fabrication efforts, since such continuous lens or mirror surfaces are relatively simple to fabricate.

Having the support structure 500 in a configuration similar to that of a lens additionally assists in the case of bonding the optical elements 110 to the support structure 500 by use of a UV curing adhesive. The translucent characteristic of the support structure 500 thereby provides a uniform optical path for a reliable curing of the optical adhesive.

In the case of soldering or brazing the optical elements 110 to a lens like support structure 500 made of glass, a chromium layer may be initially deposited on the reference surface 501. Chromium is well-known for its advantageous adherence to glass. A gold layer may be deposited on top of the chromium layer to assure reliable mechanical connection to the solder. Finally, a thin solder layer is deposited on top of the gold layer prior to contacting the optical elements 110 with the reference surface 501. In a following heating process, the solder is temporarily liquefied and the optical elements 110 are soldered to the reference surface 501. To reduce thermal deformation during the soldering, the support structure 500 may be made of fused silica.

The present invention includes embodiments in which the optical surface 10 is adjacent to the reference surface 501. In that case, the reference features 106 are placed together with the optical surfaces 10 on the same side of the optical elements 110.

Accordingly, the scope of the invention described in the specification above is set forth by the following claims and their legal equivalent.

What is claimed is:

1. An optical component including multiple optical surfaces, said optical component comprising:
    a support structure including a reference surface;
    a number of optical elements each of them including:
        an optical surface; and
        a reference feature placed in a predetermined fashion on said optical element; and
    a fixing medium for rigidly holding said optical elements on said support structure,
    wherein said optical elements are arrayed on top of said reference surface by contacting said reference surface with said reference feature, wherein each of said optical surfaces is in a distinct spatial orientation relative to said support structure.

2. The optical component of claim 1, wherein said reference feature is placed on a rear surface of said optical element, said rear surface being on the opposite side of said optical surface.

3. The optical component of claim 1, wherein said reference feature is placed together with said optical surface on the same side of said optical element.

4. The optical component of claim 1, wherein said optical elements are simultaneously fabricated from a wafer.

5. The optical component of claim 1, wherein said reference feature is provided by an edge formed by a cutout contour of said optical elements.

6. The optical component of claim 5, wherein said reference feature is provided by corner points of said edge.

7. The optical component of claim 1, wherein said support structure is a prefabricated lens.

8. The optical component of claim 1, wherein said support structure is a prefabricated mirror.

9. The optical component of claim 1, wherein said optical surface is a mirror surface.

10. The optical component of claim 1, wherein said optical surface is a lens surface.

11. The optical component of claim 1, wherein said fixing medium is a UV curable adhesive.

12. The optical component of claim 1, wherein said fixing medium is a solder for soldering said optical elements.

13. The optical component of claim 12, wherein said support structure is made of glass and wherein said reference surface comprises:
    a first metal layer deposited on said glass and selected from a first group of metals adhering to said glass; and
    a second metal layer deposited on said first metal layer, said second metal layer being selected from a second group of metals adhering to said first metal layer and adhering to said solder.

14. The optical component of claim 13, wherein said support structure is made of fused silica.

15. The optical component of claim 1, wherein said fixing medium is a brazing material for brazing said optical elements.

16. The optical component of claim 15, wherein said support structure is made of glass and wherein said reference surface comprises:
    a first metal layer deposited on said glass and selected from a first group of metals adhering to said glass; and
    a second metal layer deposited on said first metal layer, said second metal layer being selected from a second group of metals adhering to said first metal layer and adhering to said brazing material.

17. The optical component of claim 16, wherein said support structure is made of fused silica.

18. A method for fabricating an optical component including multiple optical surfaces, said method comprising:
- fabricating an initial optical surface on the top surface of a wafer;
- attaching said wafer with said initial optical surface on a first side of an adhesive film, wherein a bottom surface of said wafer remains freely accessible;
- defining reference features on said bottom surface;
- separating said wafer via said bottom surface into a number of optical elements in correspondence with said reference features while maintaining a structural integrity of said adhesive film;
- contacting a second side of said adhesive film with a temporary reference surface of a temporary fixture, wherein said reference features point away from said temporary fixture;
- positioning a final support structure with respect to said temporary fixture, wherein said reference features contact a final reference surface of said final support structure;
- bonding said optical elements to said final support structure; and
- removing said temporary fixture and said adhesive film.

19. The method of claim 18, wherein defining reference features on said bottom surface is an integral part of separating said wafer in as much as said reference features are defined by edges formed between a cutting gap and the remainder of said bottom surface, said cutting gap resulting from said separating.

20. The method of claim 18, wherein contacting the second side of said adhesive film with the temporary reference surface includes stretching of said adhesive film.

21. The method of claim 20, wherein said stretching is dynamically adjusted as a function of contacting progression between said adhesive film and said temporary reference surface.

22. The method of claim 18, further comprising establishing an adhesive connection between said adhesive film and said temporary reference surface, wherein establishing the adhesive connection being performed concurrently with contacting the second side of said adhesive film with the temporary reference surface.

23. The method of claim 22, wherein said adhesive connection is regionally establishing in conjunction with a stretching characteristic of said adhesive film.

24. The method of claim 22, wherein said adhesive connection is regionally establishing in conjunction with a curvature of said temporary reference surface.

25. The method of claim 18, wherein said reference features are adhesively fixed on said final reference surface during the positioning of the final support structure with respect to said temporary fixture.

26. The method of claim 18, wherein bonding said optical elements to said final support structure is accomplished by filling a cavity between said adhesive film, said optical elements and said final reference surface with an adhesive followed by curing said adhesive.

27. The method of claim 26, wherein said adhesive is a UV curable adhesive.

28. The method of claim 27, wherein said final support structure is translucent and wherein a curing light is applied to said adhesive via said final support structure.

29. The method of claim 18, wherein bonding said optical elements to said final support structure is accomplished by soldering said optical elements to said final reference surface.

* * * * *